United States Patent [19]

Helary et al.

[11] Patent Number: 4,710,342
[45] Date of Patent: Dec. 1, 1987

[54] STRUCTURE ASSEMBLABLE AND DISASSEMBLABLE ON A RACKING SITE FOR THE STORAGE OF NUCLEAR REACTOR FUEL ELEMENTS

[75] Inventors: Louis J. Helary, Nantes; Pierre Grenon, Treilleres, both of France

[73] Assignee: Et.Lemer & Cie., Cedex, France

[21] Appl. No.: 751,776

[22] PCT Filed: Oct. 17, 1984

[86] PCT No.: PCT/FR84/00232

§ 371 Date: Jun. 19, 1985

§ 102(e) Date: Jun. 19, 1985

[87] PCT Pub. No.: WO85/01827

PCT Pub. Date: Apr. 25, 1985

[30] Foreign Application Priority Data

Oct. 19, 1983 [FR] France .................. 83 16847

[51] Int. Cl.⁴ .................. G21C 19/40; G21C 19/06
[52] U.S. Cl. .................. 376/272
[58] Field of Search .................. 376/272, 462; 250/506.1, 507.1

[56] References Cited

U.S. PATENT DOCUMENTS

| | | | |
|---|---|---|---|
| 4,024,406 | 5/1977 | Bevilacqua | 376/272 |
| 4,042,828 | 8/1977 | Rubinstein et al. | 376/272 |
| 4,124,445 | 11/1978 | Mollon | 376/272 |
| 4,143,276 | 3/1979 | Mollon | 376/272 |
| 4,187,433 | 2/1980 | Zezza | 376/272 |
| 4,567,015 | 1/1986 | Bosshard . | |

FOREIGN PATENT DOCUMENTS

| | | | |
|---|---|---|---|
| 0071364 | 2/1983 | European Pat. Off. | 376/272 |
| 2904362 | 8/1980 | Fed. Rep. of Germany | 376/272 |
| 1488523 | 7/1967 | France | 376/462 |
| 2462767 | 2/1981 | France | 376/272 |

*Primary Examiner*—Charles T. Jordan
*Assistant Examiner*—Daniel Wasil
*Attorney, Agent, or Firm*—Pollock, Vande Sande & Priddy

[57] ABSTRACT

An assemblable and disassemblable racking structure for the storage of radioactive fuel elements, comprising the juxtapositioning of vertical, parallelepipedic racks, at least two meshed networks of horizontal bars, one fixed to a base plate and the other assembled with the upper part of the racks, horizontal strips fixed to at least two sides of the rack level with each network and cooperating with the bars of each network in order to fix the racks, the assembly of the bars of the networks to one another and the bars of the lower network to the base plate being brought about by dismantlable fixing means. The invention also relats to the process for assembling the structure.

1 Claim, 4 Drawing Figures

STRUCTURE ASSEMBLABLE AND DISASSEMBLABLE ON A RACKING SITE FOR THE STORAGE OF NUCLEAR REACTOR FUEL ELEMENTS

FIELD OF THE INVENTION

The present invention relates to a structure which can be assembled and disassembled on a racking site for the storage of nuclear reactor fuel elements, of the type comprising juxtapositioning of vertical, parallelepipedic racks which are open at their ends.

Such storage rack systems are used for storing the maximum number of nuclear reactor fuel elements in a minimum of space. Conventionally, these elements are separately placed in metal racks arranged in a support chassis. The storage and relative proximity of the fuel elements must be such as to prevent them from reaching their criticality level, and for this reason there must be a minimum spacing between the individual racks.

This spacing is dependent on the type of fuel element stored, the protection offered by the racks and the ambient storage medium (dry or in a pool). The chassis must ensure this minimum spacing and must be sufficiently nondeformable and rigid to withstand the stresses due e.g. to earth tremors.

BACKGROUND OF THE INVENTION

The racking structures for the storage of nuclear reactor fuel elements according to the prior art generally comprise a network of metal beams or girders which are welded to the racks. For example, they comprise two systems of intersecting beams forming two grids into which the racks it. Two metal enclosures maintain the peripherally positioned racks in place. All the components of these structures are mainly welded. This type of construction is described in French Pat. Nos. 2,462,767 and 2,509,899 and U.S. Pat. No. 4,187,433.

However, these structures cause problems. If they are assembled in the workshop, their transportation to the site is difficult due to their large overall dimensions and weight. If they are assembled on site, welding takes a long time and is expensive, while making their final geometry more random due to thermal stresses. The quality of the welds is difficult to inspect on site. It is also difficult to dismantle the structure without seriously damaging it.

SUMMARY OF THE INVENTION

The present invention relates to a racking structure for the storage of nuclear reactor fuel elements of the type comprising a juxtapositioning of vertical parallelepipedic racks which are open at their ends, making it possible to obviate the aforementioned difficulties and comprising:
- a horizontal base plate,
- at least two meshed networks of horizontal bars, one called the lower network, fixed to the base plate, the other assembled to the upper part of the racks, ensuring the vertical maintenace and transverse rigidity thereof by gripping in the meshes of each network,
- horizontal strips, respectively above and below the bars of the network, fixed to at least two sides of each rack level with each network, so as to cooperate with the bars in order to ensure the locking in vertical translation of each rack,
- means making it possible to hold the racks located on the periphery of the racking structure against the corresponding bars,
- the assembly of the bars of the networks with one another and the bars of the lower network to the base plate being ensured by dismantlable fixing means.

According to a preferred embodiment of the assemblable and disassemblable storage racking structure according to the invention, each of the racks comprises a tube with four lateral faces, which are parallel to one another in pairs and which define two pairs of parallel faces, and wherein the networks are in each case constituted by two lines of parallel bars defining meshes in which the said racks it, one of the lines, called the upper line, resting on the first pair of strips fixed to a first pair of parallel faces, while the second or loewr line bears under a second pair of strips to the other pair of parallel faces, so that there is a certain clearance between the bars of the upper line and the bars of the lower line, dismantlable fixing means connecting each of the lines of the same network, so as to grip the strips between the corresponding bars and fix the racks in the said meshes.

Advantageously, the means making it possible to hold the racks located on the periphery of the structure incorporate securing means fixed to the two ends of the bars of each network.

BRIEF DESCRIPTION OF THE DRAWINGS

The invention is described in greater detail hereinafter relative to non-limitative embodiments and the attached drawings.

DETAILED DESCRIPTION OF THE PREFERRED EMBODIMENTS

Figure 1:
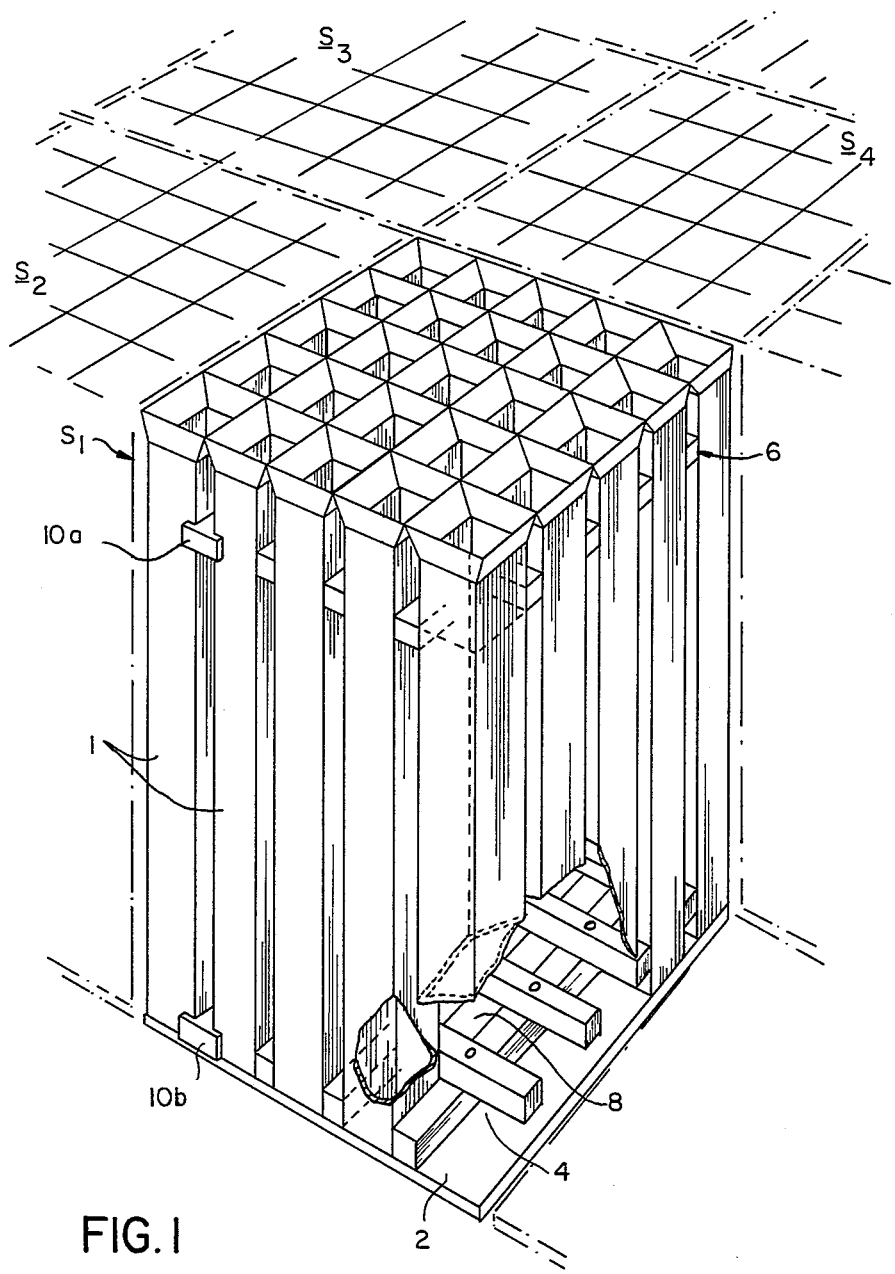
FIG. 1 is a perspective, overall view of the structure according to the invention.

FIG. 1 shows a storage assembly grouping several storage racking structures $S_1$, $S_2$, $S_3$, $S_4$, etc., according to the invention. For example, during storage in a pool, several structures according to the invention are fitted and can easily be secured. They are then arranged by juxtapositioning them, so as to form the storage assembly. FIG. 1 more specifically constitutes an exploded view of an assemblable and disassemblable structure $S_1$ for the storage racking system of nuclear reactor fuel elements according to the invention.

It firstly comprises a juxtapositioned arrangement of vertical, parallelepipedic metal racks 1, which are open at their ends. The main object of the structure according to the invention is to arrange said racks 1 and to rigidly secure the same, so that the connections between the racks and the networks are embedded or tailed-in structures. In order to satisfy this objective, the structure comprises a horizontal base plate 2, to which is fixed a lower network 4 of horizontal, parallel bars. At least one further network 6 of horizontal, parallel bars is assembled to the upper part of the racks. Thus, the racks are located in the meshes 8 defined by the networks 4, 6, the spacing between the racks being ensured by the dimensions of the bars.

Retaining parts 10a, 10b are fixed to the end of each horizontal, parallel bar, so that the racks located on the periphery of the structure can be applied to the corresponding bars. By way of example, two of such retaining parts 10a, 10b are shown in FIG. 1.

Figure 2:
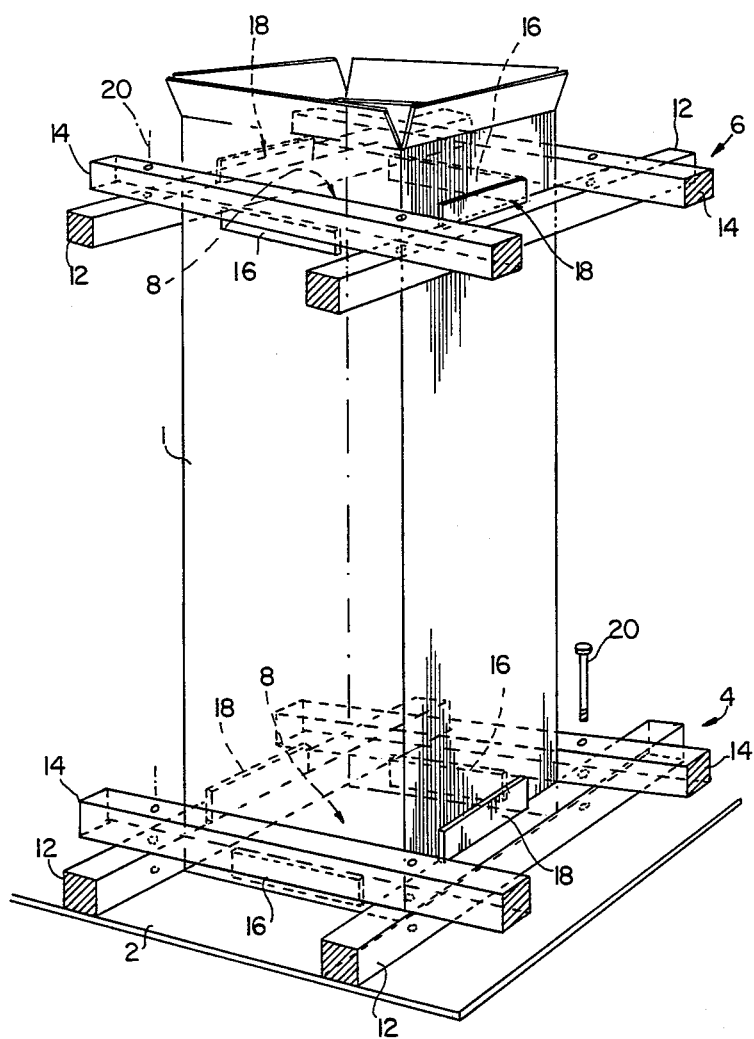
FIG. 2 shows perspective the gripping and locking of a rack by the two meshed networks of horizontal bars, in accordance with a preferred embodiment of the invention.

The means used for fixing the racks to the lower network 4 and base plate 2 and for fixing the other network 6 to the racks are shown in FIG. 2, in accordance with the preferred embodiment of the invention. FIG. 2 shows one rack 1. It is formed from a tube with four lateral faces, which are parallel to one another in pairs and which define two pairs of parallel faces. Its upper end widens in such a way that the fuel element can easily be placed in the rack.

Two meshed networks 4, 6 are shown, namely, a lower network 4 and an upper network 6. Each of them comprises two pairs 12, 14 of horizontal, parallel bars, one being called the lower line 12 and the other the upper line 14. The parallel bars of the lower line 12 are orthogonal with respect to the bars of the upper line 14, thus, defining the rectangular meshes 8 in which are placed the racks.

Level with each network 4, 6 in FIG. 2, the parallel bars of the upper lines 14 rest on a first pair 16 of strips fixed to a first pair of parallel faces of the rack. In the same way, a second pair 18 of strips fixed to a second pair of parallel faces of the rack bear against the parallel bars of the lower line 12. The two pairs 16, 18 of strips are fixed in such a way that there is a certain clearance between the bars of the upper line 14 and the bars of the lower line 12.

Assembly screws 20 pass through the bars of the same network level with their intersections. For simplicity reasons, only one screw 20 is shown in FIG. 2. The connecting stresses exerted by these screws 20 are applied in the following way. The parallel bars of the upper line 14 bear against the first pair 16 of strips which is itself integral with the second pair 18 of strips via the rack, said second pair 18 of strips bearing on the parallel bars of the lower line 12.

At the lower network 4, the assembly screws 20 also pass through base plate 2, on which rests the lower line 12 of parallel bars. This prevents vertical translation of the rack, whose connection with base plate 2 is of the tailed-in type.

At the other networks, in this case the upper network 6, the pairs 16, 18 of strips are gripped between lines 12, 14 of corresponding parallel bars, thus preventing vertical translation of the upper network 6 with respect to the rack and thus producing an embedding or tailing-in effect between them.

Advantageously, the structure is rigidified, by fixing to each end of the parallel bars a securing element 10a, 10b, which makes it possible to secure the racks located at the periphery of the structure and to lock them to the corresponding bars (FIG. 1).

In this way, a rigid, assemblable and disassemblable storage racking structure is obtained, which is able to withstand earth tremors, and it is possible to precisely position the racks in accordance with the imposed spacing.

Obviously, many modifications are possible. For example, the number of racks and networks shown is in no way limitative and is dependent on the storage requirements. It is also possible to use other means for securing the racks to the periphery of the structure, e.g. a metal belt gripping said racks in a detachable manner. In addition, each horizontal strip can comprise one or more pieces. In the same way, the parallel bars of the lower line 12 of the lower network 4 fixed to base plate 2 can be subdivided into several parts. It is also possible to use bars with different shapes, e.g., solid, hollow, U-shaped, etc.

The structure according to the invention offers the following advantages. In the normal case of racks welded to the base plate, the connection obtained is not of the tailed-in type, although one of the main features of the structure according to the invention is to bring about a tailing-in of the racks on to the base plate via the lower network of parallel bars, pairs of strips and fixing means. In the same way, there is a tailing-in effect between the racks and the upper network of parallel bars by means of pairs of strips and corresponding fixing means. Thus, the structure according to the invention makes it possible for the racks to effectively participate in rigidifying the storage racking system. Assembly can be carried out on site, which makes it possible to transport the parts in the unassembled state, to save space and weight and facilitate transport. There is no need for specialized assembly buildings. Cleaning and passivation are facilitated, because they can be carried out on small volume components (bars and plates) and not on a previously assembled structure. There are better guarantees regarding the final quality obtained. Thus, because no welding operations are carried out, there is no need to X-ray the welds as is normally the case, and in addition the physical and chemical characteristics of the materials used are not deteriorated by overheating due to welding. The absence of welding operations eliminates thermal stresses and prevents the dimensional accumulation of assembly errors and expansions. The bars according to the invention are previously accurately perforated in the workshop, which makes it possible to respect the desired dimensions of the racking system, the minimum spacing between each rack and the overall dimensions of the racking system. It is possible to dismantle and work on one or more damaged racks without any deterioration to the overall structure.

Figure 3:
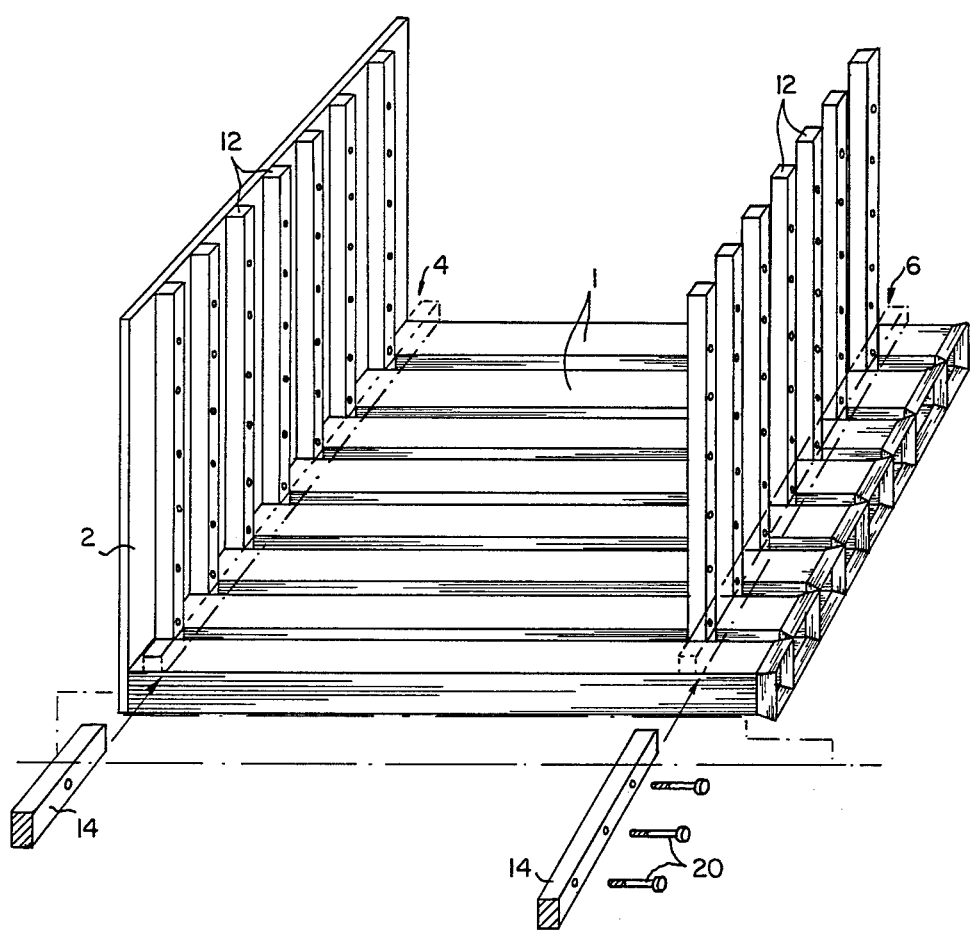
FIG. 3 shows perspective an overall view of the partly fitted structure resting on its side, a phase of the assembly process according to the invention.

An assembly phase of the stroage racking system according to the invention is shown in FIG. 3, and the assembly process comprises:

installing assembly jigs (not shown) for the vertical positioning of base plate 2 and each lower line 12 of vertically straightened parallel bars, positioning the base plate 2 and the lower lines 12 of parallel bars, horizontally fitting a first row of racks 1.

Figure 4:
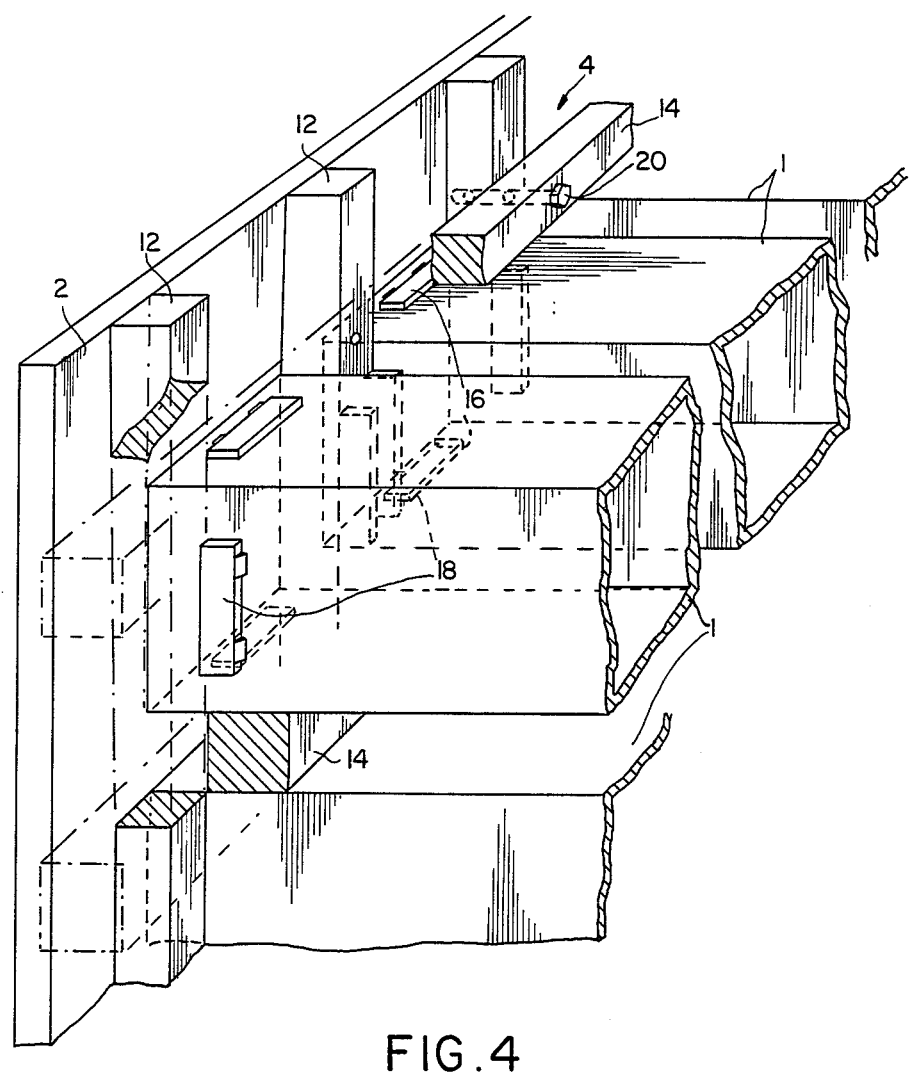
FIG. 4 shows perspective locking of the racks by a meshed network on the base plate, during a phase of the assembly process according to the invention.

FIG. 4 shows that the second pair 18 of strips of each rack 1 is applied to the corresponding parallel bars of the lower lines 12 by placing the corresponding bar of the upper line 14 level with each network 4, 6, it being applied to the first pair 16 of pairs of each rack 4 (FIG. 4);

fixing by means of screws 2 the parallel bars of the upper lines 14 to the parallel bars of the lower lines 12 by gripping the pairs 16, 18 of strips between them, the parallel bars of the lower line 12 of the lower network 4 also being fixed to the base plate 2, repeating the operation of installing a row of racks and fixing the bars of the corresponding upper line until the desired number of rows is obtained;

fixing the securing parts 10a, 10b to each end of the bars of the structure, so as to obtain a non-deformable., rigid structure (FIG. 1).

It is then possible to vertically straighten the structure and place it at its intended location in the storage assembly on the site. Disassembly of the structure according to the invention takes place by performing the assembly operations in precisely the reverse order.

Compared with known procedures, this assembly process has the advantage of being fast, respecting the dimensional characteristics imposed and consequently permitting the production of a storage racking system at a cost well below that conventionally encountered in such cases.

A description has been given hereinbefore of an assembly process in which the racks are installed horizontally. However, it is possible to vertically assemble the structure, by carrying out the same operations as described hereinbefore. The assembly jigs are then modified to keep the upper network of parallel bars horizontal.

What is claimed is:

1. An assemblable and disassemblable nuclear fuel element storage rack structure comprising (a) a juxtapositioning of vertically arranged parallelepipedic racks, said racks being open at their ends and having two pairs of respectively parallel faces;

(b) a horizontal base plate;

(c) at least two meshed networks of horizontal bars, each said network comprising a first series of parallel bars and a second series of parallel bars which are crossed with the bars of said first series, thereby defining openings, each of said openings receiving one said rack, a first of said networks, called lower network, being fixed to said base plate, and a second of said networks being located at an upper part of said racks;

(d) dismantlable fixing means connecting, in each of said networks, the bars of said first series to the bars of said second series, and in said lower network, the bars of each series of bars to said base plate;

(e) at least two horizontal strips fixed to two different faces of each said rack, substantially at level of each said network, a first of said strips being located in contact with and above one bar of said first series and a second of said strips being located in contact with and below one bar of said second series, whereby said racks are locked with respect to said networks of bars; and (f) means securing said racks located on the periphery of said rack structure against the bars located at the ends of each said series.

* * * * *